United States Patent [19]

Fischer et al.

[11] Patent Number: 5,941,923
[45] Date of Patent: *Aug. 24, 1999

[54] METHOD OF AND APPARATUS FOR REGULATING THE TRANSMISSION OF TORQUE

[75] Inventors: Robert Fischer; Michael Salecker, both of Bühl; Burkhard Kremmling, Renchen, all of Germany

[73] Assignee: Luk Getriebe-Systeme GmbH, Buhl/Baden, Germany

[*] Notice: This patent is subject to a terminal disclaimer.

[21] Appl. No.: 08/619,929

[22] Filed: Mar. 18, 1996

[30] Foreign Application Priority Data

Mar. 18, 1995 [DE] Germany ............... 195 09 930

[51] Int. Cl.$^6$ ............................................. G06G 7/70
[52] U.S. Cl. .................. 701/53; 701/68; 701/54; 701/67; 477/154
[58] Field of Search ............... 364/424.08, 424.089, 364/424.091, 424.94, 424.083, 426.043, 431.07; 477/74, 120, 121, 97, 101, 98, 106, 109, 125, 129, 131; 192/4 A; 74/335, 336 R; 701/51, 52, 53, 54, 66, 67, 68, 154, 155

[56] References Cited

U.S. PATENT DOCUMENTS 4,228,700 10/1980 Espenschied et al. ............... 477/154
4,259,882 4/1981 Miller ............................ 477/155
4,584,906 4/1986 Nagaoka et al. ............... 364/424.094
4,917,063 4/1990 Hiraki ............................ 123/357
4,922,424 5/1990 Hiramatsu ........................ 701/53
5,097,726 3/1992 Asada ............................. 477/121
5,169,365 12/1992 Friedmann ........................ 474/18
5,214,983 6/1993 Kobayashi et al. ............ 364/424.089
5,257,193 10/1993 Kusaka et al. ................ 364/424.083
5,409,091 4/1995 Reik et al. ...................... 192/70.25
5,484,350 1/1996 Ishikawa et al. .................. 477/97
5,632,706 5/1997 Kremmling et al. .............. 477/74
5,674,155 10/1997 Otto et al. ...................... 477/176

FOREIGN PATENT DOCUMENTS 39 35 439 A1 5/1991 Germany.

Primary Examiner—Jacques H. Louis-Jacques
Attorney, Agent, or Firm—Darby & Darby

[57] ABSTRACT

Torque which is being transmitted by a clutch in the power train of a motor vehicle is regulated in response to processed signals from a control unit which receives signals denoting the driver's desire concerning the acceleration of the vehicle as well as numerous other variables including the position of the gas pedal, the RPM of the engine, the input and/or the output RPM of the transmission and others. The regulation is planned in such a way that the vehicle undergoes a higher than standard acceleration at the desired rate and that the thermal stressing of the clutch is minimized.

59 Claims, 8 Drawing Sheets

METHOD OF AND APPARATUS FOR REGULATING THE TRANSMISSION OF TORQUE

BACKGROUND OF THE INVENTION

The invention relates to improvements in methods of and apparatus for transmitting torque, and more particularly to improvements in methods of and in apparatus for regulating the operation of adjustable torque transmission systems—such as friction clutches or other types of clutches—in the power trains of motor vehicles.

Published German patent application No. 3935439 proposes to start a motor vehicle by setting the clutch in the power train of the vehicle by way of a control circuit. The control circuit ascertains the RPM of the combustion engine and adjusts the clutch setting apparatus in such a way that the difference or error between the signal denoting the actual RPM and desired RPM disappears In other words, the transmission RPM is caused to follow the engine RPM which latter rises during starting of the vehicle. Eventual fluctuations of the regulated transmission RPM are to be avoided by a special regulator characteristic.

OBJECTS OF THE INVENTION

An object of the invention is to provide a novel and improved method of regulating the transmission of torque, particularly in the power trains of motor vehicles.

Another object of the invention is to provide a method of regulating the operation of torque transmission systems, such as clutches, in the power trains of motor vehicles.

A further object of the invention is to provide a method which renders it possible to ensure a superior acceleration of a motor vehicle to a selected speed.

An additional object of the invention is to provide a method of regulating the operation of a torque transmission system by taking into consideration the wishes or desires of the operator of the motor vehicle.

Still another object of the invention is to provide a method of regulating the operation of a torque transmission system in a power train of a motor vehicle in such a way that the desires of the driver of the vehicle regarding the acceleration of the vehicle are taken into consideration automatically and in such a way that the vehicle can undergo an optimum acceleration from zero speed to a desired speed.

A further object of the invention is to provide a novel method of determining the wishes of the operator of a motor vehicle regarding the acceleration, particularly the duration of acceleration, from a first speed to a second speed.

Another object of the invention is to provide a simple method which, in spite of its simplicity, constitutes a substantial improvement over heretofore known methods of regulating the operation of clutches and/or other types of torque transmission systems, particularly in the power trains of motor vehicles.

An additional object of the invention is to provide a method which renders it possible to take into consideration relatively large or relatively small numbers of various parameters of motor vehicles, their prime movers, their transmissions, their auxiliary aggregates, their clutches and/ or other constituents.

Still another object of the invention is to provide a novel and improved apparatus for the practice of the above outlined method.

A further object of the invention is to provide an apparatus which can be installed in or combined with the power trains of known types of vehicles.

Another object of the invention is to provide a novel and improved apparatus for regulating the operation of clutches and/or other types of torque transmission systems in motor vehicles.

An additional object of the invention is to provide a power train which embodies or is combined with the above outlined apparatus.

Still another object of the invention is to provide a motor vehicle which embodies the above outlined apparatus.

SUMMARY OF THE INVENTION

One feature of the present invention resides in the provision of a method of regulating the operation of an adjustable torque transmission system (such as a friction clutch) in a motor vehicle which is accelerable from zero speed and embodies a power train including the torque transmission system, a prime mover (such as an internal combustion engine) and a variable-ratio transmisson downstream of the prime mover (as considered in the direction of power flow from the engine toward the front and/or rear wheels of the vehicle). The vehicle wherein the operation of the torque transmission system is regulated in accordance with the present invention further comprises a device (such as a fork and/or a clutch engaging/disengaging bearing) for adjusting the torque transmission system so as to vary the torque which is being transmitted by the system, a signal processing and transmitting control unit for the adjusting device, an electronic unit arranged to transmit to the control unit signals to enable the control unit to ascertain at least one of (a) an operating condition of the vehicle and (b) a vehicle driver's or operator's desire concerning the operating condition. This method comprises the steps of accelerating the vehicle in at least two stages, and transmitting during the at least two stages from the adjusting device to the torque transmission system signals to effect an adjustment of the torque transmission system which ensures a planned acceleration of the vehicle in dependency upon at least one of (i) at least one preselected value and (ii) at least one function.

Another feature of the instant invention resides in the provision of a method of regulating the operation of an adjustable torque transmission system in a power train of a motor vehicle which is accelerable from zero speed and wherein the power train further includes a prime mover (such as a combustion engine) upstream and a variable-ratio transmission downstream of the torque transmission system. The vehicle further comprises a device for adjusting the torque transmission system so as to vary the torque which is being transmitted by the system, a central signal processing and transmitting control unit for the adjusting device, and electronic units arranged to transmit to the control unit signals which enable the control unit to determine—within at least one region of the torque transmission system—at least one of an energy input and a temperature. This method comprises the steps of accelerating the vehicle from the zero speed; and adjusting the transmission of torque by the torque transmission system during acceleration of the vehicle from zero speed so that, at first, the transmissible torque at least approximates zero until the variable RPM of the prime mover at least reaches (i.e., reaches or at least slightly exceeds) a threshold value, and that the vehicle undergoes a first acceleration at least when the RPM of the prime mover reaches the threshold value, with attendant variation of the transmissible torque to reduce the RPM of the prime mover, to achieve a more pronounced acceleration of the vehicle, and to reduce the energy input at least within a portion of the torque transmission system.

The electronic unit or units can include one or more sensors which transmit signals denoting the RPM of the prime mover and/or one or more sensors capable of transmitting signals denoting the input RPM and/or the output RPM of the transmission. Furthermore, the electronic unit or units can include one or more sensors constructed and/or positioned to transmit signals denoting the position of the throttle valve in the motor vehicle, the quantity of injected fuel, the pressure in the suction intake manifold, the RPM of the wheels and/or other parameters. In fact, the electronic unit or units can comprise two or more tachometers or tachometer generators. Still further, such unit or units can comprise the control system of an ABS system and/or an arrangement which prevents slip between the relatively rotatable parts of the torque transmission system, the electronic curcuit of the prime mover and/or other signal transmitting arrangements.

As already mentioned above, the improved method can bring about a reduction of the energy input at least within a portion of the torque transmission system, e.g., between the friction linings of a clutch disc in a friction clutch on the one hand, and the axially movable pressure plate and the flywheel or counterpressure plate of such clutch on the other hand. This can be accomplished by resorting to a controlled regulation of the torque being transmissible by the torque transmission system. The energy input can be detected and/or calculated on the basis of sensor signals and/or system input values. Alternatively or in addition to the above step or steps, the regulation of torque to be transmitted by the torque transmission system for the purpose of reducing the energy input can be carried out in such a way that the vehicle undergoes a more pronounced acceleration during a first acceleration stage or phase and/or the energy input into the torque transmission system and/or the thermal stressing of the torque transmission system is reduced.

It can be of advantage if an increased or more pronounced acceleration of the motor vehicle, at least during the initial stage of acceleration, brings about and/or causes and/or initiates or introduces a reduction of the energy input into the regions of the torque transmission system.

A further feature of the invention resides in the provision of a method of regulating the operation of a torque transmission system (e.g., a friction clutch) in a motor vehicle which is accelerable from zero speed. This method comprises the steps of accelerating the vehicle in at least two stages (for example, in exactly three stages or in exactly two stages or in more than three stages), and adjusting the transmission of torque by the torque transmission system within the at least two stages (or within more than two stages) in dependency upon at least one of (a) at least one of a plurality of presentable values and (b) at least one function, in order to thus achieve a planned acceleration of the vehicle.

The adjusting step can include maintaining the torque transmission system in disengaged condition at least during a portion of a first stage of acceleration of the vehicle.

The method can comprise the additional step of effecting an increase of the RPM of a variable-RPM prime mover (such as an internal combustion engine) in the power train of the vehicle at least close to a predetermined RPM during the first stage of acceleration of the vehicle.

The adjusting step can include maintaining the transmitted torque at least close to zero during the first stage of acceleration of the vehicle.

The method can further comprise the steps of effecting an increase of the RPM of the prime mover in the power train of the vehicle to a predetermined RPM during a first portion of the second stage, maintaining the input RPM of a transmission in the power train at least close to zero during the first portion of the second stage, and increasing the input RPM of the transmission to at least approximate the RPM of the prime mover at the end of the second stage. The torque which is transmissible by the torque transmission system during the first stage can be rather small or essentially zero while the RPM of the prime mover rises to the predetermined value. This means that, if the torque transmission system is or includes or forms part of a friction clutch, the clutch is engaged only to such an extent that it transmits no torque or transmits only a minimal or negligible torque. Under such circumstances, the RPM of the prime mover can be increased essentially without any drag torque.

The vehicle can be accelerated from zero speed (from a standstill) or while it carries out a slight rolling movement, for example, while being supported by a sloping road surface.

It is also possible to carry out the adjusting step in such a way that it includes selecting the transmission of torque during the second stage to increase the RPM of the prime mover in the power train of the vehicle to a desired value, not later than is necessary to maintain the input RPM of the transmission (such as a manual transmission) in the power train at least close to zero not later than during a first portion of the second stage of acceleration of the vehicle, and to increase the input RPM of the transmission to at least approximate the RPM of the prime mover not later than at the end of the second stage.

If the stages include at least three (or exactly three) stages, the adjusting step can comprise selecting the transmission of torque during the third stage in such a way that the input RPM of the torque transmission system is varied as a function of time and in at least substantial synchronism with the output RPM of the torque transmission system. Such adjusting step can further comprise selecting the transmission of torque during the third stage in dependency upon a selected drive ratio of the transmission in the power train of the motor vehicle (such power train also includes the torque transmission system). The input RPM of the torque transmission system can sink, rise or remain unchanged together with the input RPM of such system, i.e., the two RPMs are or can be identical during the third stage of acceleration of the vehicle. Changes as a function of time are or can be essentially proportional and the purpose of the just outlined adjusting step is to achieve an at least slightly higher than standard acceleration of the vehicle. The same result can be obtained if the adjusting step includes equalizing the input RPM of the torque transmission system with its output RPM in the second stage of acceleration. Still further, a higher than standard acceleration of the vehicle can be arrived at if the adjusting step comprises at least substantially equalizing in the second stage the RPM of the prime mover with the output and/or input RPM of the transmission.

At least one of the preselectable value and the at least one function can be in the form of signals denoting the desire of the driver concerning the acceleration of the motor vehicle.

Furthermore, at least one of the at least one preselectable value and tile at least one function of time can be in the form of input parameters pertaining to the torque transmission system.

If the at least one of the at least one preselectable value and the at least one function is in the form of signals denoting the desire of the driver concerning the acceleration of the vehicle, the method can further comprise the step of generating the signals on the basis of at least one of a plurality of different positions, a plurality of different dynamics and a plurality of different gradients of a load lever (for example, the gas pedal) of the motor vehicle. In lieu of the just mentioned signal generating step, such method can comprise the steps of generation and long-range adaptation of the signals on the basis of at least one of a plurality of different positions and a plurality of different gradients of the load lever.

If at least one of the at least one preselectable value and the at least one function is in the form of signals denoting at least one of (A) a driver of the vehicle and (B) a desire of the driver concerning the acceleration of the vehicle and based on at least one of (C) driver identification and (D) actuation of a selector switch, the adjusting step can include utilizing such signals to achieve an adaptive regulation of acceleration of the vehicle from zero speed.

The improved method can be put to use with particular advantage if the desired value of acceleration at the end of the first stage and at the onset of the second stage of acceleration is ascertained on determined or initiated in dependency on the driver's desire concerning the acceleration. The engine RPM rises accordingly during the first stage from a value which can correspond to the idling RPM to a value which can be ascertained on the basis of the position and/or speed of movement and/or the acceleration of the load lever. If at least one of the preselectable value or values and the at least one function involves the determination of the driver's desire concerning the acceleration of the vehicle, the thus obtained signal or signals can be utilized to select the desired intensity of acceleration of the vehicle. In the first acceleration stage, the engine RPM can rise in a planned manner in dependency on the desired intensity of acceleration to an individual value before the torque transmission system (such as a friction clutch) is set to become engaged, i.e., before the clutch can begin to transmit at least some torque.

Otherwise stated, the accelerating step can include determining or fixing or selecting the speed of the vehicle at the end of the first stage and at the start of the second stage to match a desired value in dependency upon the desire of the driver of the vehicle.

The adjusting step can comprise selecting the RPM of the prime mover in the power train of the vehicle to at least approximate the idling RPM at the start of the first stage and to rise at least approximately to a desired RPM between the start and the end of the first stage.

The adjusting step can comprise a planned increase of at least one of the input RPM of the torque transmission system and the RPM of the prime mover of the vehicle.

The adjusting step can also comprise developing the timely progress of at least one of the input RPM of the torque transmission system and the RPM of the prime mover of the vehicle and, during the second stage, developing the timely progress of at least one of the input RPM of the torque transmission system and the input RPM of the transmission in the power train in dependency upon a selected torque being transmissible by the torque transmission system. Thus, the control unit presents or preselects the transmissible torque, and the RPM of the output part of the torque transmission system and/or the RPM of the transmission depends upon or follows such preselected transmissible torque.

The adjusting step can comprise maintaining, in the second stage of acceleration of the vehicle, at an at least substantially constant value at least one of the input RPM of the torque transmission system and the RPM of the prime mover, and conforming to such constant value at least one of the output RPM of the torque transmission system and the input RPM of the transmission. Such method can further comprise the step of utilizing the torque which is transmissible by the torque transmission system during the second stage to reduce at least one of the input RPM of the torque transmission system and the RPM of the prime mover, and the step of at least substantially conforming the output RPM of the torque transmission system and the input RPM of the transmission to the reduced RPM.

The improved method can further comprise the steps of utilizing the adjusted torque to effect a reduced increase or the input RPM of the torque transmission system, and of conforming at least one of the output RPM of the torque transmission system and the input RPM of the transmission to the variable input RPM of the torque transmission system.

If the acceleration of the vehicle takes place in at least three stages, the adjusting step can comprise matching the input RPM and the output RPM of the torque transmission system at a synchronizing instant during the third stage, and increasing the input RPM in synchronism with the output RPM during the third stage subsequent to the synchronizing instant. The increasing step can include increasing the input RPM and the output RPM of the torque transmission system as a function of the speed ratio of the transmission in the power train of the motor vehicle. In lieu of increasing the input RPM of the torque transmission system in synchronism with the output RPM of such system, or in addition to such step, it is also possible to ensure that the input RPM and the output RPM exhibit a synchronous development as a function of time.

The adjusting step can include effecting a first acceleration of the vehicle during the second stage and a lesser second acceleration during the third stage. This means that the transmission of transmissible torque by the torque transmission system ensures an acceleration of the vehicle which is more pronounced during a preceding stage than during a following acceleration stage.

The adjusting step can include carrying out an initial part of the planned acceleration of the vehicle with a view to reduce thermal stresses upon the torque transmission system. The wear upon various parts of the torque transmission system can be reduced in an analogous manner, and each such reduction contributes to longer useful life of the torque transmission system as well as of the power train which embodies the system.

The torque transmission system can be operated with varying degrees of slip, and the initial part of the planned acceleration can entail a reduction of the input RPM of the torque transmission system and a reduction of slip which is more pronounced and takes place within a shorter interval of time than a less pronounced (or at most equal) reduction of slip which could be achieved in the absence of the carrying out of the initial part of the planned acceleration of the vehicle with a view to reduce the thermal stresses upon tile torque transmission system.

The method can further include the step of increasing the RPM of the prime mover to a threshold RPM or a threshold value, and the adjusting step then comprises varying the transmission of torque as a function of time subsequent to the step of increasing the RPM of the prime mover in order to effect a reduction of the RPM of the prime mover and an attendant reduction of torque which is being transmitted by the prime mover to less than the torque which is being transmitted by a clutch of the torque transmission system as well as a higher acceleration of the vehicle and a reduction of thermal stresses upon the torque transmission system.

The method can further comprise the step of effecting a reduction of the RPM of the prime mover in the power train of the vehicle in the second stage of acceleration of the vehicle in response to the adjustment of transmission of torque by the torque transmission system until the completion of an at least substantial synchronization of input RPM and the output RPM of the transmission in the power train of the vehicle.

The method can also comprise the step of operating the torque transmission system with a variable slip between at least one driving part and at least one driven part of the torque transmission system at least substantially only in the second stage of acceleration of the vehicle.

If the torque transmission system includes or constitutes or forms part of a clutch, such as a friction clutch, the method can further comprise the step of ascertaining (e.g., by way of calculation) the energy input into portions of the torque transmission system in dependency upon differences between the RPMs of relatively rotatable friction surfaces of the clutch and/or the transmitted clutch torque.

The method can further comprise the step of calculating the thermal stress upon at least a portion of the torque transmission system in accordance with the equation $$E_K = \int |\omega_M - \omega_K| * M_K dt,$$

wherein $E_K$ is friction energy developing between relatively rotatable parts of the torque transmission system, $\omega_M$ denotes a variable input RPM of the torque transmission system, $\omega_K$ denotes a variable output RPM of the torque transmission system, and $M_K$ denotes the transmitted torque.

The method can further comprise the step of ascertaining the thermal stress upon at least a portion of the torque transmission system, including dynamically determining—as a function of time—the cooling of the torque transmission system due to heat conduction and/or heat radiation and/or convection.

The method can also comprise the step of ascertaining or calculating the energy input and/or the temperature of at least one portion of the torque transmission system as a function of at least one of a plurality of signals denoting the variable RPM of the prime mover in the power train of the vehicle, a variable angle of the throttle valve of the motor vehicle, the negative pressure in the suction intake manifold of the vehicle, the input RPM of the transmission in the power train, branching(s) of one or more auxiliary consumers in the vehicle, at least one tachometer generator of the vehicle, the position of an actuating member (such as a fork or a bearing) for a clutch of the torque transmission system, the output RPM of the transmission, the input RPM of the torque transmission system, one or more temperature sensors, the torque which is being applied to the torque transmission system and the torque which is being transmitted by the torque transmission system.

The method can also comprise the step of adaptively regulating a variable threshold value of the RPM of the prime mover in the power train of the vehicle prior to the first stage of actual acceleration of the vehicle, e.g., prior to the second stage.

The adjusting step can comprise adjusting the transmission of torque upon a determination of the desire of the driver of the vehicle regarding the acceleration of the vehicle and subsequent to a legitimizing of the driver in dependency upon signals from safety and/or theft prevention controls of the motor vehicle. More specifically, a driver recognition in an adaptive method can result in immediate determination that the driver desires a pronounced acceleration of the vehicle as soon as the legitimizing step is completed, and one or more signals denoting such desire are or can be immediately transmitted to the controls of the means for effecting pronounced acceleration.

The adjusting step can also comprise adjusting the transmission of torque to a desired value or to a threshold value in dependency upon a variable gradient of a load lever (such as the gas pedal) of the motor vehicle.

Still further, the adjusting step can comprise adaptively ascertaining the position of the gas pedal of the vehicle and selecting an adaptively fixed threshold value for the RPM of the prime mover prior to initiation of transmission of a transmissible torque.

The method can comprise the additional step of adaptively selecting a maximum RPM for the prime mover in the power train of the vehicle. Such maximum RPM can be selected in dependency upon the desire of the driver regarding the acceleration of the vehicle.

The method can also comprise the additional steps of adaptively ascertaining the position and/or the dynamics of the gas pedal, and adaptively selecting a final value of the RPM of the prime mover.

The transmission (e.g., a manual transmission) can be installed in the power train of the motor vehicle upstream of the torque transmission system. The positioning of the transmission upstream of the system can be as considered in the direction of power flow and/or spatially. It is also possible to employ an automatic transmission or an automated multiple ratio transmission; such transmission can shift into a limited number or into an infinite number of different gears or gear ratios.

Last but not least, the adjusting step can comprise adjusting the transmission of torque in dependency upon the output RPM of the torque transmission system in lieu of the input RPM of the transmission in the power train of the motor vehicle.

An additional feature of the invention resides in the provision of an apparatus for regulating the operation of a torque transmission system in a power train of a motor vehicle, such system being accelerable from zero speed. The apparatus comprises means for adjusting the torque transmission system in a planned manner to achieve an increased or more pronounced (higher than standard) acceleration of the vehicle. The apparatus can further comprise at least one sensor having means for generating signals denoting a substantial or complete stillstand or a slight rolling movement of the motor vehicle.

The apparatus can also comprise at least one sensor having means for generating signals which denote a starting of the vehicle and/or the intention(s) of the driver regarding the acceleration of the vehicle. All such signals are or can be transmitted to a central control unit of the improved apparatus for processing and utilization in regulating the operation of the torque transmission system. The signal or signals denoting the intention(s) of the driver can indicate the driver's desire(s) concerning the acceleration of the vehicle and the intensity and/or other characteristics of such acceleration. For example, the signal(s) denoting the intention(s) or desire(s) of the driver can constitute signals which are generated in dependency upon the position and/or the gradient of a load lever (such as the gas pedal) in the motor vehicle.

The power train of the motor vehicle further includes a prime mover (such as a combustion engine) which can have a range of RPMs above and below a predetermined value, and a transmission which is adjustable to assume a plurality of positions including a neutral position. The adjusting means of such apparatus is or can be operative to evaluate an adjustment of the transmission by the driver or operator of the motor vehicle to a position other than the neutral position (while the RPM of the prime mover exceeds the predetermined value) as an indication of the driver's or operator's desire to achieve the higher acceleration of the vehicle and to effect the higher acceleration as a result of such evaluation. The predetermined value of the RPM of the prime mover can be between 1,000 and 6,000 RPM. The input RPM of the transmission can rise in synchronism with the RPM of the prime mover when the RPM of the prime mover rises to a given value which at least approximately matches or exceeds the predetermined value. The given value can at least approximate that RPM of the prime mover at which the RPM of the prime mover at least approximates the input RPM of the transmission while the torque transmission system is engaged to transmit torque in the power train of the motor vehicle.

Still another feature of the present invention resides in the provision of an apparatus for regulating the operation of a friction clutch or an analogous adjustable torque transmission system in the power train of a motor vehicle which is accelerable from zero speed. The apparatus comprises an activatable adjusting device for the torque transmission system, a signal receiving, processing and transmitting central control unit, and at east one electronic unit having means for supplying to the control unit signals denoting a plurality of input values pertaining to an operating condition of the vehicle so that the control unit actuates the adjusting device to effect an increased or higher than standard acceleration of the vehicle. The signals can denote the desires of the driver of the vehicle concerning the acceleration of the vehicle.

The novel features which are considered as characteristic of the invention are set forth in particular in the appended claims. The improved method and apparatus themselves, however, both as to the construction of the apparatus and the steps of the method, together with numerous additional features and advantages thereof, will be best understood upon perusal of the following detailed description of certain presently preferred specific embodiments with reference to the accompanying drawings.

DESCRIPTION OF PREFERRED EMBODIMENTS

Figure 1:
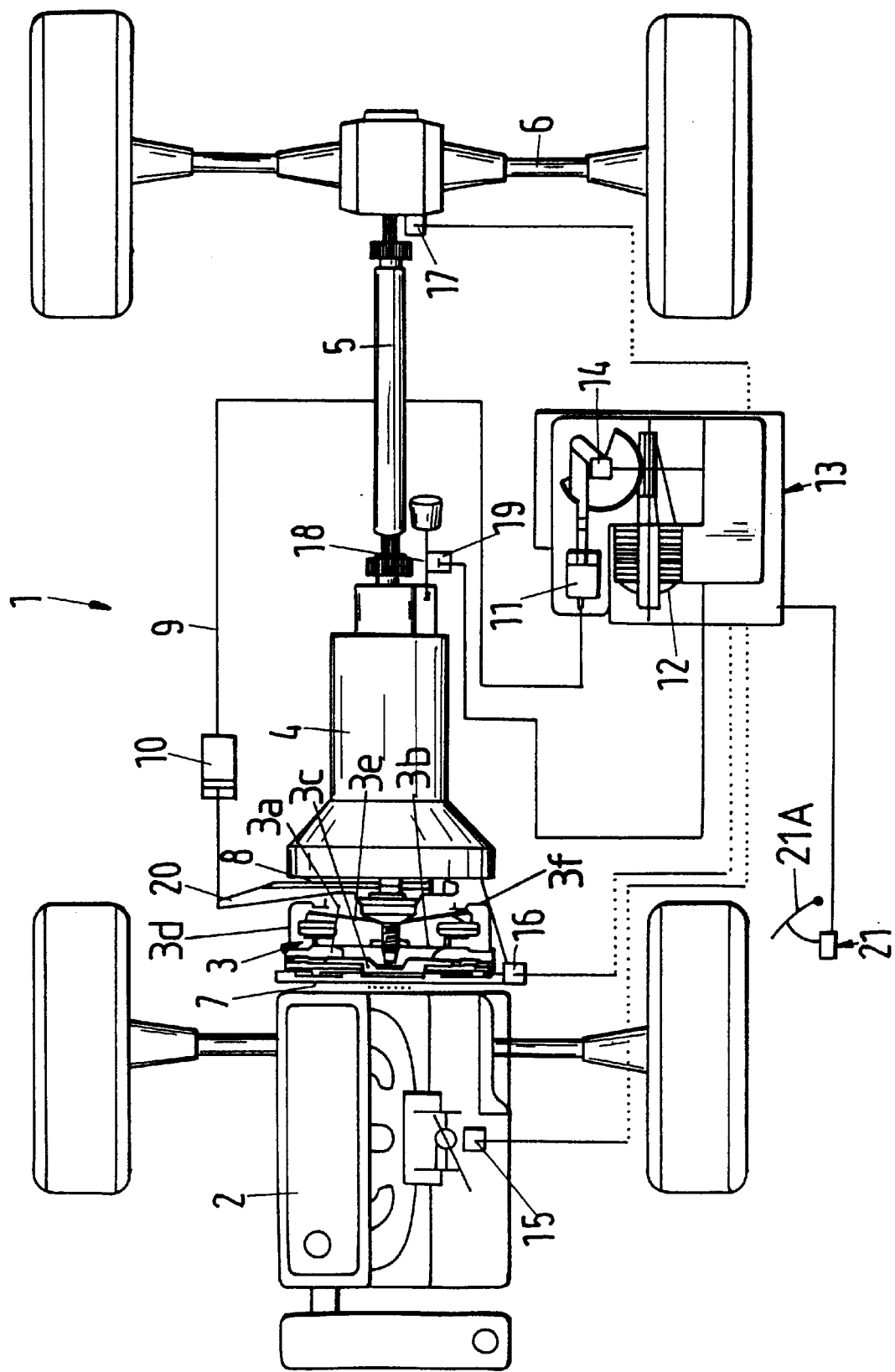
FIG. 1 is a schematic partially plan and partially sectional view of certain details of a motor vehicle having a power train with a torque transmission system the operation of which can be regulated in accordance with the present invention.

FIG. 1 shows certain component parts of a motor vehicle 1 with a power train including a combustion engine 2, a multiple ratio transmission 4 and a torque transmission system 3 between the engine and the transmission. The output element of the transmission 4 is a rotary shaft 5 which transmits torque to an axle 6 for the front or rear wheels when the engine 2 is on and the transmission 4 drives the axle 6.

The torque transmission system 3 can constitute a clutch, such as a friction clutch of the type often employed in the power trains of motor vehicles. For example, the system 3 can constitute a so-called self-adjusting friction clutch which is designed to automatically compensate for wear upon the friction linings 3a at both sides of a clutch disc 3b which drives the input element of the transmission 4 when the system 3 (hereinafter called clutch for short) is at least partially engaged. The clutch disc 3b is disposed axially between a flywheel 3c which is driven by the output element of the engine 2, and an axially movable pressure plate 3d which is biased by a clutch spring 3e (e.g., a diaphragm spring) to clamp the friction linings between the flywheel and the pressure plate when the clutch is at least partially engaged. Reference may be had, for example, to commonly owned U.S. Pat. No. 5,409,091 granted Apr. 25, 1995 to Reik et al. for "Automatically adjustable friction clutch" which discloses several embodiments of a self adjusting friction clutch for use in motor vehicles. The arrangement is such that the pressure plate 3d is shifted incrementally in the axial direction toward the flywheel 3c in order to compensate for wear upon the friction linings 3a and, if necessary, upon certain other parts (such as the flywheel 3c, the pressure plate 3d, the clutch spring 3e, resilient segments (if any) of the clutch disc 3b and leaf springs between the pressure plate 3d and a housing or cover 3f) of the friction clutch 3. The disclosure of the patent to Reik et al. as well as of any and all other publications mentioned in this specification is incorporated herein by reference.

The illustrated transmission 4 is a manual transmission and can be of any known design having a variable-RPM input and a variable-RPM output. However, the friction clutch 3 and the novel regulating apparatus therefor can also be utilized (with equal or similar advantage) in power trains which employ automatic transmissions; the torque transmission system of a power train which employs an automatic transmission can constitute a starter clutch, a torque converter with a bypass or lock-up clutch, or a clutch downstream of the automatic transmission.

The reference character 7 denotes the input side and the reference character 8 denotes the output side of the clutch 3. If the RPM of the input side 7 departs from that of the output side 8 (i.e., because the clutch 3 operates with slip between the clutch disc 3b and its friction linings 3a on the one hand, and the pressure plate 3d and flywheel 3c on the other hand), the resulting energy input into the clutch 3 is dependent upon the magnitude of the applied torque and the extent of slip (i.e., the difference between the RPM of the clutch disc 3b and the flywheel 3c which latter is driven by the engine (prime mover) 2 and drives the pressure plate 3d and the housing 3f). Under such operating conditions, the kinetic energy is converted into friction energy with attendant increase of the temperature of the clutch 3 in the region of the friction linings 3a. In the absence of any undertakings to the contrary, such rise of temperature at the clutch disc 3b could result in partial or even total destruction of the friction linings 3a or even of the entire clutch 3. Moreover, the increased thermal stressing of the parts including and adjacent the friction linnigs 3a entails a more pronounced wear upon some or all constituents of the clutch 3.

The operation (the degree or extent of engagement or disengagement) of the clutch 3 is regulated by an apparatus which includes a control unit 13. The latter includes or can include or cooperates with an actor and with electronic controls. The electronic controls can include a central computer unit as well as a complete logic circuit which can read signals furnished by one or more sensors and/or other types of electrical or electronic control units, which can process the incoming signals, and which can tranmit appropriate signals for the regulation of the operation of the clutch 3. The actor comprises a prime mover 12 (e.g., an electric motor) and a master cylinder 11 which can receive motion from the prime mover 12 by way of a suitable transmission, such as a worm gearing and a push rod. The movements of the push rod and of the reciprocable piston in the master cylinder 11 are monitored by a sensor 14 serving to generate signals which denote the extent of movement of one or more component parts of the clutch 3. A hydraulic conduit 9 connects the master cylinder 11 with a slave cylinder 10 of the actor, and the piston rod carrying the axially movable piston of the slave cylinder 10 transmits motion to a clutch engaging and disengaging member 20. The latter determines the extent of engagement or disengagement of the clutch 3, i.e., the magnitude of torque which is being transmitted between the input and output sides 7 and 8 and hence between the flywheel 3c and the input element of the transmission 4. The illustrated friction clutch 3 is at least partially engaged when the spring 3e is free to urge the pressure plate 3d against the adjacent friction lining 3a with a force which suffices to clamp the clutch disc 3b between the friction surfaces of the flywheel 3c and the pressure plate 3d so that the clutch disc 3b is driven (with or without slip, depending upon the extent of engagement of the clutch 3) to drive the input element of the transmission 4. The improved regulating apparatus is capable of effecting a planned (i.e., predetermined or preselected) engagement of the clutch and hence a planned selection of the magnitude of torque being transmitted between the prime mover 2 and the transmission 4 in the power train of the motor vehicle 1.

The clutch plate 3d has limited freedom of axial movement between two end positions in one of which the clutch 3 is fully engaged (without any slip between the parts 3a, 3b on the one hand and the parts 3c, 3d on the other hand) and in the other of which the clutch is fully disengaged so that the friction surfaces of the parts 3c, 3d are out of contact with the adjacent friction linings 3a and the parts 3c, 3d, 3e and 3f are free to rotate relative to the parts 3a, 3b and the input element of the transmission 4. If the clutch 3 is to transmit a torque which is less than the maximum transmissible torque, the member 20 is caused to select the axial position of the pressure plate 3d in such a way that the parts 3c, 3d can rotate the parts 3a, 3b but with a selected amount of slip so that the RPM of the clutch disc 3b and hence of the input element of the transmission 4 is less than the RPM of the flywheel 3c and the output element of the prime mover 2. In other words, the actor can cause the member 20 to select for the clutch 3 a large number of settings or adjustments in each of which the magnitude of the transmitted torque assumes one of an equally large number of different values.

The improved clutch torque regulating apparatus comprises numerous additional sensors and/or other electronic units some of which are shown in FIG. 1. The illustrated sensors include a sensor 15 which is designed to transmit signals denoting the position of a mobile throttle valve in the motor vehicle 1, an engine RPM sensor 16 which can monitor the rotational speed of the output element of the engine 2 and/or the RPM of the flywheel 3c (the latter is attached to and receives torque from the output element of the engine), and a tachometer generator 17 which transmits signals denoting the RPM of the axle 6 or of a part in the connection (such as a differential) between the output shaft 5 and the axle 6. The apparatus also comprises a sensor 19 which transmits signals denoting the positions of a hand shift lever 18 for the transmission 4 (in fact, the positions of the lever 18 can be monitored by two or more sensors 19 and/or analogous sensors). The purpose of the sensor 19 is to transmit signals which denote the selected gear or drive ratio of the transmission 4 and/or the intention or desire to shift the transmission into a selected gear. A sensor 21 is installed to monitor the position of a load lever 21A, such as a gas pedal. By detecting the changes in the position of the load lever 21A as a function of time, the sensor 21 can transmit signals for observation and evaluation of the dynamics of the load lever. Analogous information can be obtained by monitoring the position or condition of one or more parts other than the load lever 21A, as long as the thus obtained information serves the intended purpose of denoting the position of the load lever and/or of another mobile part the movements of which can be monitored to obtain information identical with or analogous to that supplied by the sensor 21.

The control unit 13 has inputs which are at least temporarily connected with the outputs of the aforementioned sensors or analogous electronic units. The unit 13 processes the incoming signals and its output or outputs transmit processed signals to the prime mover 12 of the actor for appropriate regulation of the clutch 3 so that the latter transmits torque from its input side 7 to its output side 8 (i.e., from the output of the prime mover 2 to the input of the transmission 4) at a desired optimal rate. To this end, a control program in the form of hard- and/or software is implemented in the control unit 13.

The operation of the regulating apparatus is preferably such that a predetermined torque is or can be selected for practically each and every operating point. Such predetermined torque is calculated on the basis of system input values and/or other information, such as that transmitted by a data bus from other electronic units including, for example, the electronic circuit of the prime mover 2, the electronic circuitry of an automatic braking system (ABS system) and/or an antislip regulator. The torque calculated or determined for all or nearly all operating points is that which can be transmitted between the input and output sides 7, 8 of the clutch 3, and it is possible to take into consideration an adaption. The position of the clutch engaging and disengaging member 20 is set by the actor including the parts 9, 10, 11 and 12 so that the selected position is indicative of the torque which can be transmitted by the clutch 3 at a particular operating point. Once the master cylinder 11 of the actor receives one or more signals from the control unit 13, the actor causes its slave cylinder 10 to select a corresponding position for the member 20 so that the clutch 3 is set for the transmission of a preselected torque for the corresponding operating point.

As described above, the illustrated actor is designed in such a way that the master cylinder 11 can actuate the slave cylinder 10 by way of the fluid-containing connection 9, and the slave cylinder 10 effects appropriate adjustments of the member 20, i.e., appropriate setting for transmission of torque by the clutch 3. However, it is equally possible to employ a different actor, e.g., a mechanical connection between the output or outputs of the control unit 13 and the member 20. A mechanical connection is also capable of moving the member 20 between two end positions in one of which the clutch 3 is engaged and in the other of which the clutch is disengaged, as well as through any desired number of intermediate positions in each of which the clutch 3 is set to transmit a different torque between the prime mover 2 and the transmission 4. For example, a mechanical connection can employ a setting motor which performs the function of the electric motor 12 in the illustrated actor, and a linkage or link train between the setting motor and the member 20. The latter can constitute a standard fork which can effect axial movements of a standard engaging/disengaging bearing in or for the clutch 3. Still further, the member 20 can form part of or can cooperate with a fluid-operated (hydraulic or pneumatic) clutch engaging/disengaging arrangement.

The torque transmission system the operation of which is to be regulated in accordance with the method and by resorting to the apparatus of the present invention can constitute the starter clutch of an automatic transmission, e.g., a transmission of the type disclosed in the commonly owned U.S. Pat. No. 5,169,365 granted Dec. 8, 1992 to Friedmann for "Power train". The disclosure of this patent is also incorporated herein by reference. Still further, a clutch or another torque transmission system to be operated in accordance with the method and with the apparatus of the present invention can be installed upstream or downstream of an automatic transmission, and such system can constitute or include a starting clutch, an inverting clutch or a safety clutch.

Figure 2A:
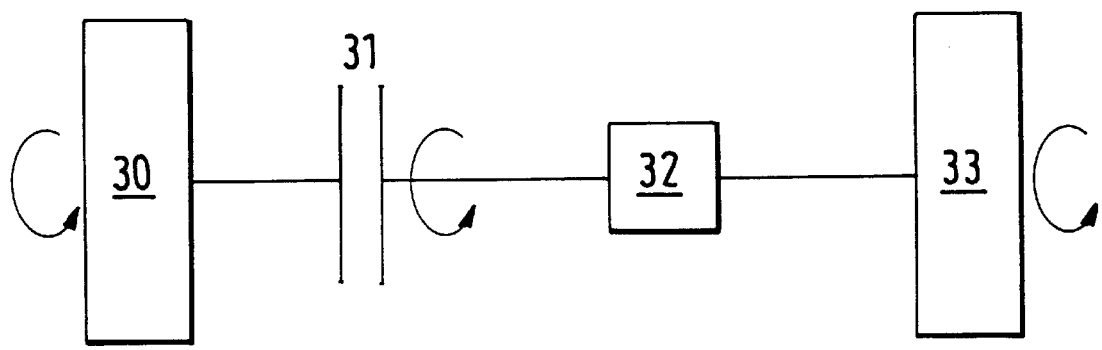
FIG. 2a is a block diagram of a first power train in the vehicle.
Figure 2B:
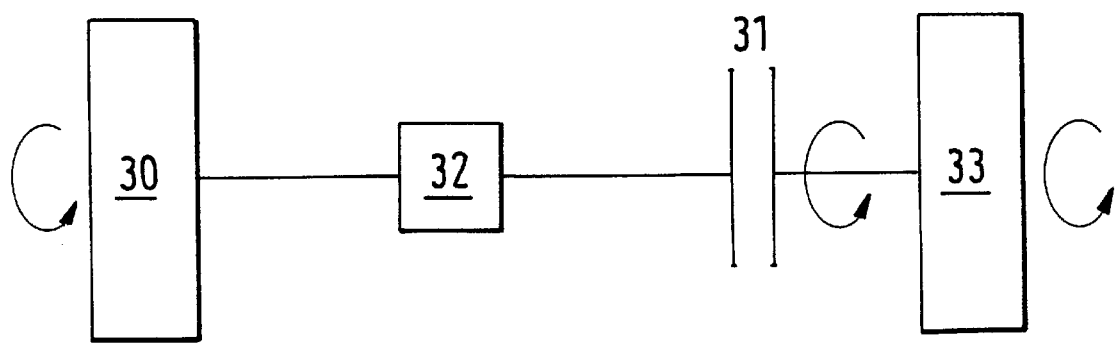
FIG. 2b is a similar diagram of a modified power train.

FIGS. 2a and 2b illustrate two modes of ascertaining the longitudinal or linear dynamics of a vehicle. The two modes are directed to vehicle systems with two moments of inertia or rotational inertias and a clutch which establishes a connection between the two moments of inertia. Furthermore, FIGS. 2a and 2b show schematically devices for changing the ratio of the transmission. In each of these Figures, the block 30 denotes the mass moment of inertia of the engine, and the block 33 denotes the mass moment of inertia of the vehicle. The torque transmission system (e.g., a friction clutch) is denoted by the reference character 31. FIG. 2a shows the system 31 between the engine and and a torque regulating or varying apparatus 32 with the latter disposed upstream of the block 33, as seen in the direction of the power flow from the engine toward the wheels. In FIG. 2b, the apparatus 32 is located upstream of the torque transmission system 31. It is further possible to provide two apparatus 32, one upstream and other downstream of the system 31; this would amount to a combination of the features which are shown in FIGS. 2a and 2b.

The torque $M_M$ which is available at the engine (note the block 30) and the engine RPM $\omega_M$ can be calculated or ascertained on the basis of signals which are transmitted by sensors and/or on the basis of data ascertainable from characteristic curves and/or characteristic fields. Furthermore, it is also possible to obtain such information, for example, from a control arrangement in an engine management and/or an antiblock system (ABS).

The variable-ratio transmission, such as a manual transmission or an automatic transmission, determines the transmission ratio V which can be ascertained by resorting to one or more sensors, e.g., sensors which can recognize the selected drive ratio or position sensors which can recognize and/or detect the momentary ratio of an automatic transmission and can transmit appropriate signals to the signal processing means. For example, the transmission ratio V can be ascertained from the ratio of a signal denoting the engine RPM and a tachometer signal by taking into consideration the slip of the clutch which constitutes or forms part of or includes the torque transmission system.

In this manner, one can also ascertain the input RPM $\omega_A$ and/or the output RPM $\omega_K$ of the clutch.

The system is further determined by the RPM $\omega_F$ of the vehicle. In the embodiment of FIG. 2a, $\omega_F$ equals $\omega_K \cdot V$; on the other hand, in FIG. 2b $\omega_F$ equals $\omega_K$. The system is further determined by the torque $M_{FW}$ of the vehicle (applied at 33).

If one analyzes on the basis of the information furnished by FIG. 2a the longitudinal or linear dynamics of a vehicle, friction energy ($E_K$) which develops in the torque transmission system 31 in response to the development of slip between the input and output sides of the system can be rapidly and reliably ascertained on the basis of the following equation:

$$E_K = \int |\omega_M - \omega K_K| * M_K dt,$$

i.e., the friction energy $E_K$ is dependent upon the slip differential RPM $\omega_M - \omega_K$ and the applied clutch torque $M_K$. In the novel apparatus for regulating the operation of the torque transmission system, the various parameters (such as RPMs and torques) can be calculated and/or ascertained (either directly or indirectly) and, consequently, the friction energy can be ascertained and/or calculated practically at any time at the computer cycle or at a multiple of the computer cycle.

Furthermore, the friction energy can be calculated and/or ascertained by taking into consideration a cooling behavior or pattern, for example, with a linear time response.

As a rule, starting of a motor vehicle invariably entails the development of slip in the torque transmission system (such as a friction clutch or a torque converter bypass clutch) irrespective of whether the torque transmission system is operated electronically, mechanically and/or hydraulically. Such slip in the torque transmission system, in turn, causes the development of friction energy and hence of a more pronounced thermal stress, particularly a rise of temperature at least at the friction linings on the clutch disc.

For example, an excessive rise of temperature can cause damage to the friction linings and/or to the adjacent parts of a friction clutch as well as to the bearing or bearings between relatively rotatable parts of a friction clutch and/or to the engaging/disengaging bearing of the clutch. Moreover, long-lasting overheating of one or more constituents of the torque transmission system can result in deformation and/or breaking of one or more parts, such as the pressure plate (refer to the part 3d shown in FIG. 1) of a clutch which forms part of or includes or constitutes the torque transmission system being regulated in accordance with the present invention. In fact, even short-lasting overheating can entail a highly pronounced wear upon one or more parts of the torque transmission system which can entail a pronounced reduction of the useful life of such system.

As already mentioned above, the quantity of friction heat which develops in the torque transmission system depends upon the slip between the input and output sides of the torque transmission system, upon the clutch torque and upon the duration of slip, e.g., between the friction linings 3a and the clutch disc 3b of FIG. 1 on the one hand, and the flywheel 3c and pressure plate 3d of the clutch 3 on the other hand.

Figure 3:
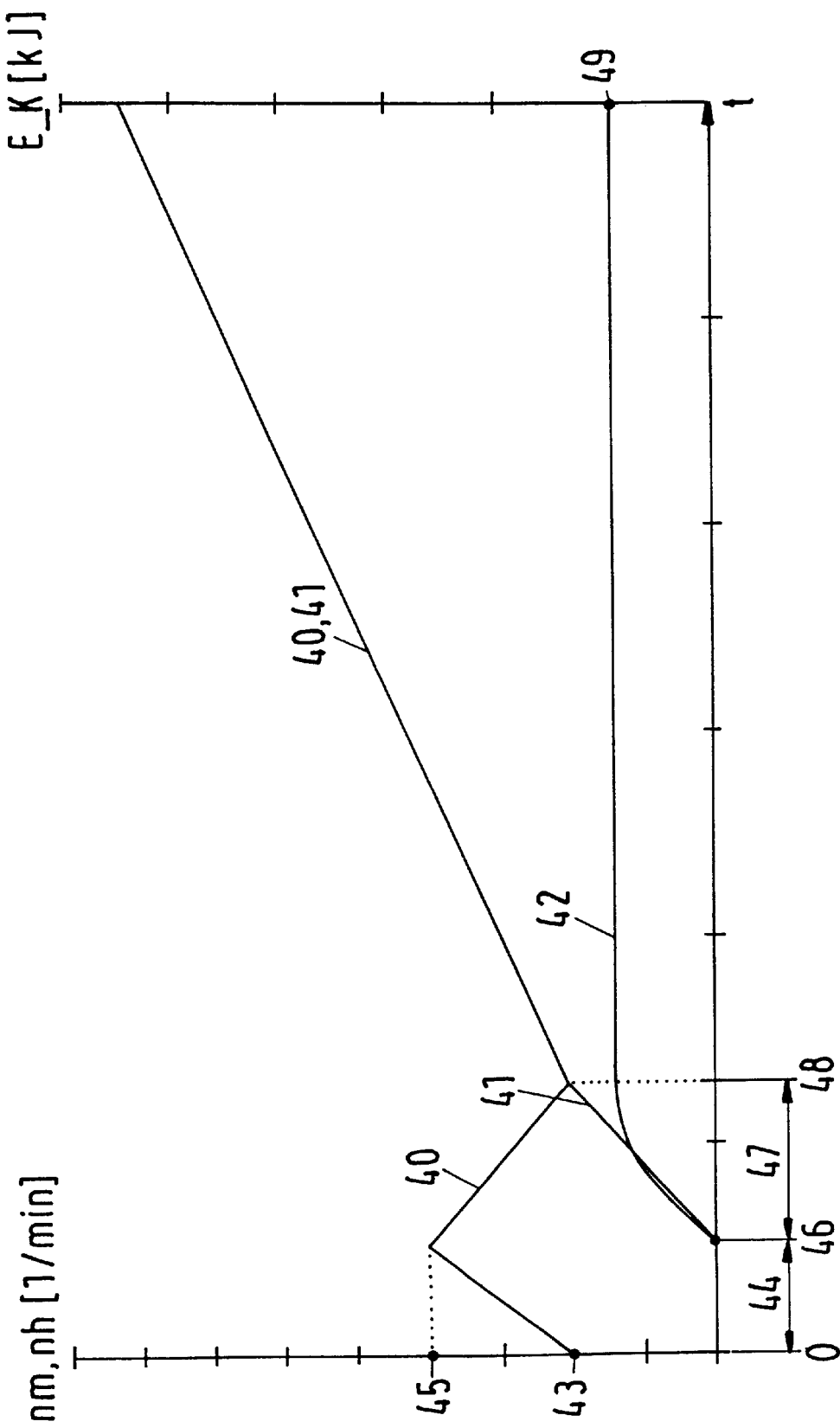
FIG. 3 is a diagram wherein the curves denote the engine RPM, the transmission RPM and the friction energy of the torque transmission system during different stages or intervals of acceleration of the motor vehicle.

The diagram of FIG. 3 illustrates the relationship of the engine RPM 40, the transmission input RPM 41 and the friction energy 42 of the clutch when the magnitude of torque being transmissible by the clutch is regulated in accordance with the present invention. The curve denoting the engine RPM 40 is plotted as a function of time t (measured along the abscissa of the ordinate system shown in FIG. 3), and the curve denoting the transmission input RPM 42 is plotted in accordance with the embodiment of FIG. 2a, again as a function of time. The integrated progress of the friction energy 42 is also plotted in the form of a curve, again as a function of time.

At the instant t=0, a starting operation is initiated on the basis of a driver's desire for an increased or pronounced acceleration. The engine RPM (denoted by the curve 40) rises from an idling value 43 within a first phase, stage or interval 44 to a value 45. During this first stage 44 of an increase of the engine RPM (curve 40), the magnitude of transmissible torque remains at least substantially unchanged, i.e., the torque which can be transmitted during the first stage 44 at least approximates or only slightly exceeds zero. Also, the transmission input RPM (curve 41), too, equals or approximates or only slightly exceeds zero. FIG. 3 shows that, during the first stage 44, the transmission input RPM (curve 41) and the friction energy (curve 42) actually equal zero.

At the instant 46 (between the first stage 44 and the second stage 47), the engine RPM (curve 40) reaches a predetermined threshold value (shown at 45), and the novel method then provides for an increase of the transmissible torque (i.e., for a torque which exceeds zero) during the second stage 47. The exact magnitude of the threshold value 45 is dependent upon the driver's desire regarding the intensity of acceleration of the vehicle and is selected or set or adjusted accordingly.

The torque which can be transmitted by the torque transmission system during the second stage 47 can also depend upon the driver's or operator's desire for an increased or more pronounced acceleration of the motor vehicle. In the embodiment of FIG. 3, the magnitude of transmissible torque is clearly above the available engine torque and the actually applied torque and thus causes a gradual reduction of the engine RPM as denoted by that portion of the curve 40 which extends between the instant 46 denoting the end of the first stage 44 and the instant 48 denoting the end of the second stage 47 of acceleration of the motor vehicle from zero speed. However, the reduction of the engine RPM (curve 40) between the instants 46 and 48 should not be so pronounced that it could result in a choking of the engine. In other words, it is necessary to take into consideration a minimum engine RPM during regulation of the torque which can be transmitted by the torque transmission system.

FIG. 3 further shows that the reduction of the engine RPM (curve 40) during the second stage 47 is gradual or linear, as well as that the engine RPM (curve 40) at the instant 48 (end of the second stage 47) matches the transmission input RPM (curve 41).

The third stage of acceleration of the vehicle begins at the instant 48, and the engine RPM (curve 40) rises gradually during such third stage as denoted by the elongated upwardly sloping portion of the curve 40 (which coincides with The curve 41 during the entire third stage). In other words, the rise of the engine RPM (curve 40) takes place synchronously with the rise of the transmission input RPM (curve 41). During the third stage of acceleration, the slip between the input and output sides of the torque transmission system (such as the input and output sides 7, 8 of the friction clutch 3 shown in FIG. 1) is zero or practically zero or only slightly above zero.

Still further, FIG. 3 shows that the upward slope of the curve 41 (denoting the transmission input RPM) during the second interval or stage 47 is much more pronounced than during the third stage or interval (beyond the instant 48). Such steep increase of the transmission input RPM (as denoted by the curve 41) during the second interval 47 (as a function of time) entails a more pronounced acceleration of the vehicle because the torque being transmitted by the regulated torque transmitting system is being increased accordingly.

An inspection of the curves 40 and 41 (respectively denoting the engine RPM and the transmission input RPM) reveals that a slip between the input and output parts of the torque transmission system can take place only during the second stage 47. This will be readily appreciated since, during the first interval or stage 44 prior to the instant 46, the magnitude of torque being transmissible by the torque transmission system is at least close to zero whereas, during the third interval or stage (beyond the instant 48), the engine RPM (curve 40) at least substantially matches the input RPM of the transmission (curve 41).

The same behavior is exhibited by the curve 42 which denotes the accumulated or cumulative friction energy as a function of time t. The friction energy (curve 42) increases from zero during the second stage 47 to reach a constant value 49 at the instant 48. From there on (i.e., during the third, etc. stages of acceleration of the vehicle), the friction energy (curve 42) remains at least substantially unchanged.

The feature that the slip between the input side and the output side of the torque transmission system (such as between the input and output sides 7, 8 of the friction clutch 3 shown in FIG. 1) can be limited to a relatively short stage (such as the time window 47 shown in FIG. 3) constitutes a desirable and highly advantageous feature of the improved regulating method and apparatus. This is in contrast to power trains wherein the engine RPM is not caused to decrease during the respective stage of acceleration of the vehicle and, therefore, the duration of the interval which is required to reach the synchronization point is much greater with attendant extension of the interval of slip. All this is avoided by the feature that the engine RPM is caused to decrease (note the progress of the curve 40 in FIG. 3) during the second stage or time window 47 of acceleration of the vehicle by resorting to the regulating method and apparatus of the present invention.

Figure 4:
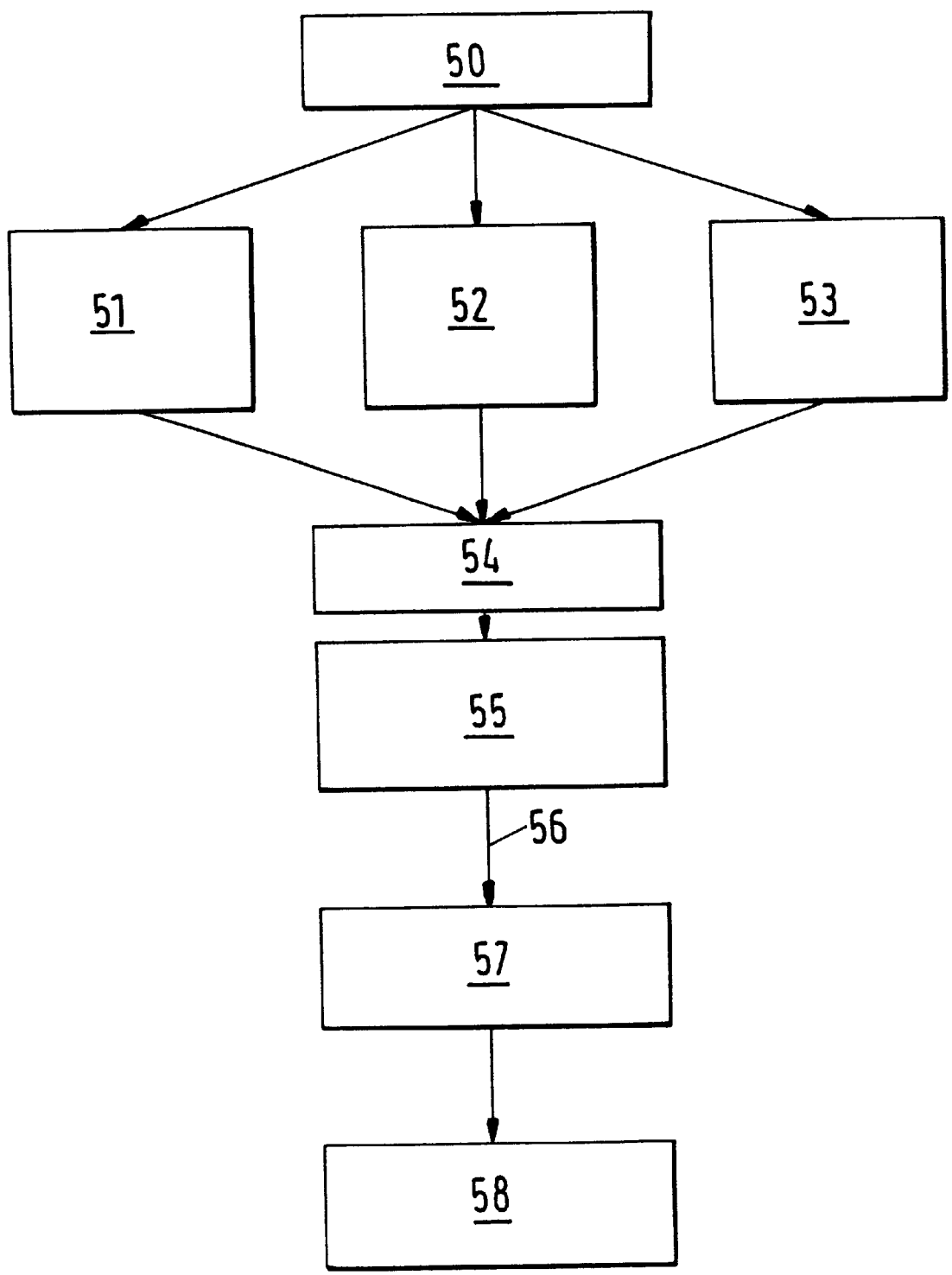
FIG. 4 is a block diagram showing the manner of taking into consideration a driver's desires concerning the acceleration of the motor vehicle.

The diagram of FIG. 4 represents the manner of recognizing a driver's desire for a pronounced acceleration of the vehicle. The block 50 is intended to represent the driver or operator of the vehicle. If the driver desires a more intensive acceleration of the vehicle, she or he can carry out a step or an operation which allows for a selection of the program. For example, a program (denoted in FIG. 4 by the block 51)

can involve a selection between a sporty and a comfortable mode of driving.

Furthermore, in accordance with an adaptive regulating method, the driver can be adapted on the basis of sensor signals and/or typical signal progressions as a function of time. For example, it is possible to detect the dynamics of the load and/or a driver can be adapted on the basis of typical timely behavior. Such driver recognition is denoted by the block 52. Furthermore, a driver recognition or acceptance can also be carried out by resorting to a legitimizing step with reference to a safety system such as a device which prevents the vehicle from being driven away.

Still another possibility of determining or ascertaining the desire of a driver as concerns the acceleration of the motor vehicle can involve a detection of the position and/or of dynamics of the load lever, such as a gas pedal. This is denoted by the block 53 in the diagram of FIG. 4. Based on the extent of actuation and/or the gradient of movement of the load lever, the apparatus can reach conclusions concerning the driver's desire regarding the acceleration of the vehicle.

The data and/or signals furnished by the sensors or other electronic units are processed in a central control unit 54 and the driver's desire regarding the acceleration of the vehicle is analyzed by means of a program or subroutine (at 55 in the diagram of FIG. 4) to generate a signal denoting an appropriate desired value 56 for the adjusting member 57. The latter performs the function of the member 20 in the vehicle of FIG. 1 in that it selects the torque which can be transmitted by the torque transmission system 58.

Figure 5:
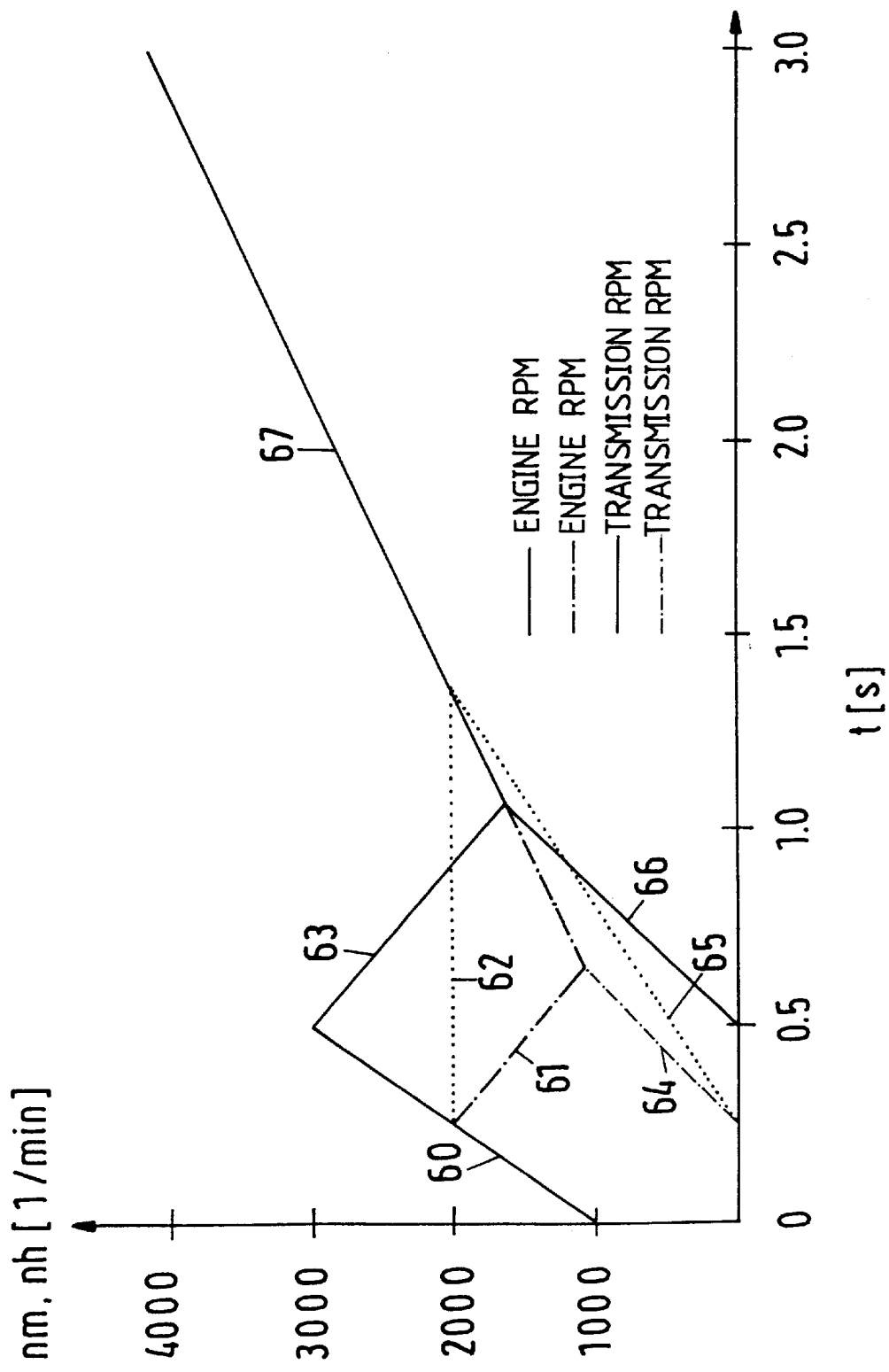
FIG. 5 is a diagram wherein the curves denote variations of the engine RPM and the transmission RPM in the power train of a motor vehicle wherein the transmission of torque by a friction clutch or an analogous torque transmission system is regulated in accordance with the method and by resorting to the apparatus of the invention.

The diagram of FIG. 5 illustrates a further mode of regulating the transmissible torque and the corresponding or resulting variations of the engine RPM (nm) and the transmission RPM (nh) as a function of time. A starting operation is initiated at the instant t=0. The engine RPM rises from an idling RPM nm=1000 1/min during a first stage (curve 60) to a value of 2000 1/min. At the end of the first stage, the RPM of the engine reaches a threshold value which can be adapted or individually determined. During the first stage, the torque transmission system is operated or started in such a way that the transmission RPM is essentially zero.

At the start of the second stage, namely when the aforementioned threshold value of the engine RPM is reached or exceeded, the transmissible torque is selected in a planned manner and the engine RPM decreases (note the phantom line 61 in the diagram of FIG. 5). The input RPM of the transmission (note the curve 64 in FIG. 5) increases in dependency upon the regulation of transmissible torque and in dependency upon the engine RPM (61). Upon completion of the second stage, the engine RPM (61) matches the transmission input RPM (64), and these two parameters thereupon increase in synchronism as indicated by the curve 67. If the driver's desire is indicative of a somewhat less pronounced acceleration of the vehicle, the magnitude of torque which can be transmitted during the second stage is regulated in such a way that the engine RPM and the transmission input RPM proceed in a manner as indicated by the respective curves 62 and 65. In accordance with a further starting procedure, the engine RPM can first rise to a higher value prior to start of the second stage. This results in the progress of engine RPM and transmission input RPM as indicated by the respective curves 63 and 66. The curve 65 is indicative of an acceleration which is more pronounced than that indicated by the curve 67. The starting procedure which is denoted by the curve 64 causes a more pronounced acceleration of the vehicle than that indicated by the curve 65. Still further, the acceleration denoted by the curve 66 is more pronounced than that indicated by the curve 64 or 65.

Figure 6:
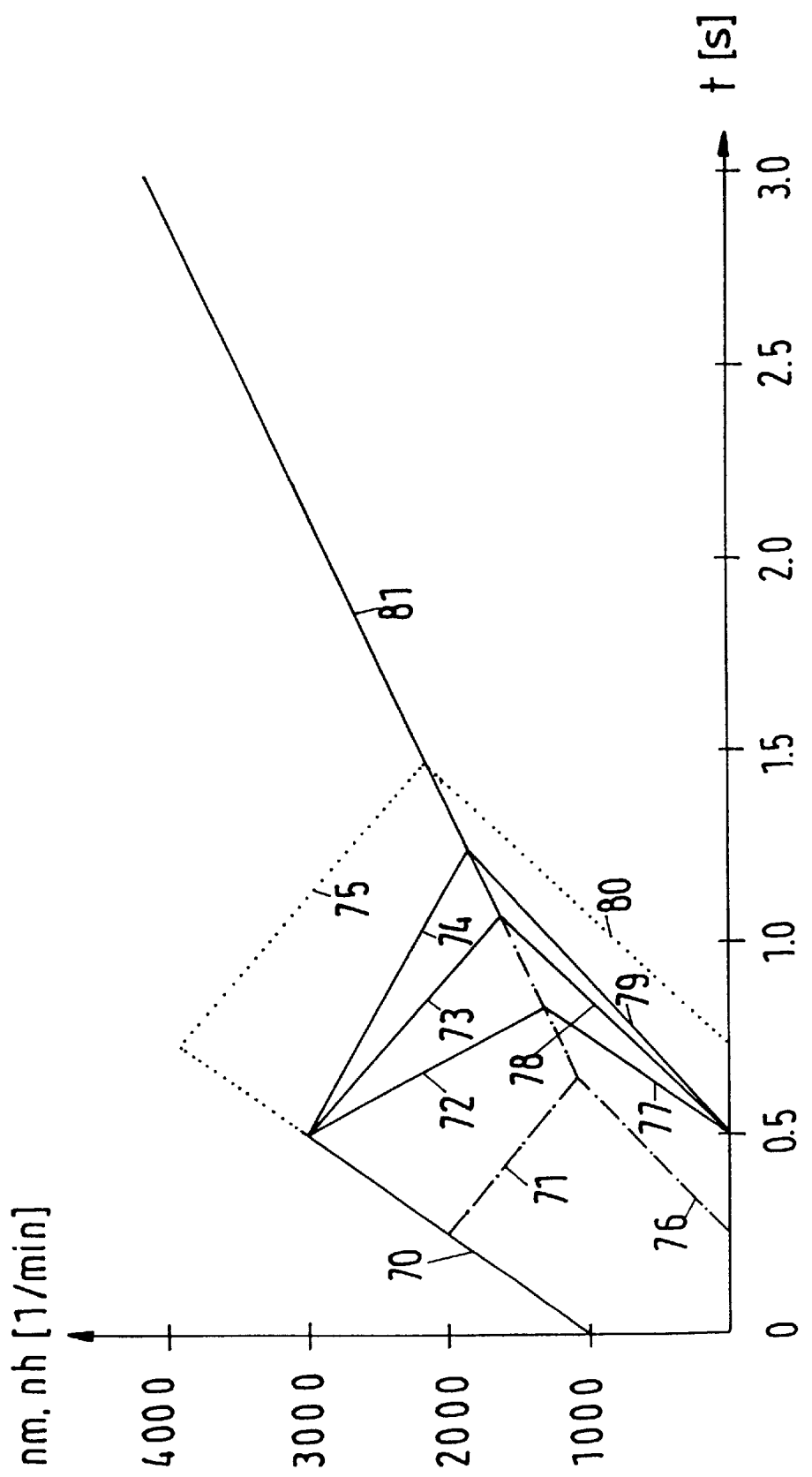
FIG. 6 is a similar diagram showing additional curves which denote the engine RPM and the transmission RPM during different stages of acceleratino of the motor vehicle.

The diagram of FIG. 6 illustrates additional examples of the progress of RPM resulting from planned regulations of the torque adapted to be transmitted by a torque transmission system, such as a friction clutch. The increase of the engine RPM during the first stage 70 can be effected in a number of different ways and can be followed by numerous different variations of such RPM during the next-following second stage of acceleration. The curves 71 to 75 and 76 to 80 represent numerous examples of the progress of RPM as a function of time, and all such variations of the RPM take place in the second stage of acceleration of the vehicle. When the second stage is completed, the increase of RPM during the next-following third stage is at least substantially uniform as indicated by the curve 81. The selection of the progress of RPM during at least one of the stages (such as the second stage), i.e., the selected regulation of planned torque transmission, is carried out in dependency upon the intensity and/or other characteristics of various signals which are indicative of the operator's desire concerning the acceleration of the motor vehicle.

Figure 7:
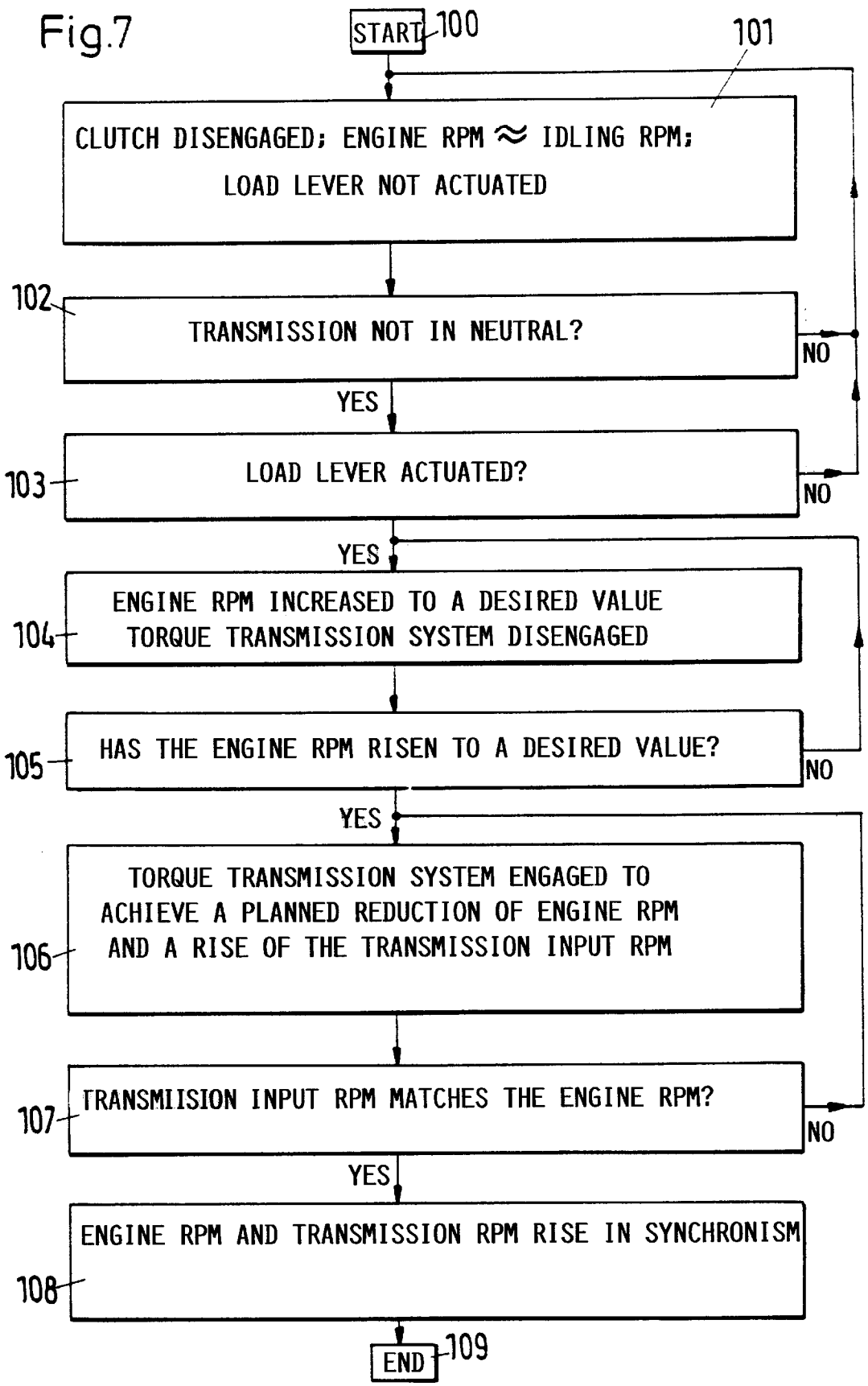
FIG. 7 is a block diagram wherein the blocks denote various steps of one presently preferred method which embodies the invention and serves to regulate the operation of a friction clutch or an analogous torque transmission system in the power train of a motor vehicle.

The diagram of FIG. 7 illustrates the progress of still another method of regulating the operation of a torque transmission system in accordance with the present invention. The method is started at 100, and the block 101 indicates the step of ascertaining whether or not the clutch (or another torque transmission system) is engaged, whether or not the engine RPM at least approximates the idling RPM and whether or not the load lever is maintained in its idle position. This is the condition of a standstill or slight rolling movement of the vehicle and, by not actuating the lead lever, the driver indicates her or his desire to maintain the vehicle in a state of standstill or slight rolling movement. The transmission input RPM can be detected or calculated, e.g., by ascertaining the RPM of the wheels. Such transmission input RPM is at least close to zero when the vehicle is at a standstill. A slight rolling movement, which can take place from time to time when the vehicle is to be started while supported by a sloping road surface, is to be interpreted as a standstill because the differences between such slight rolling movement and actual standstill are minimal.

The block 102 denotes the step of ascertaining the setting of the transmission, namely whether the transmission is in neutral or is set for a drive ratio or gear ratio. Such step can be carried out by resorting to a suitable gear ratio detecting or monitoring sensor or a sensor which transmits any other signals adapted to be interpreted to ascertain the momentary setting of the transmission. If the transmission is an automatic transmission, the step denoted by the block 102 in FIG. 7 can be omitted because, as a rule, the control circuit automatically receives information denoting the momentary setting or condition of the automatic transmission.

The block 103 in the diagram of FIG. 7 denotes the step of ascertaining the position of the load lever, i.e., whether or not the operator has depressed the gas pedal. Such determination can be carried out by resorting to a control unit which receives from one or more sensors information denoting the position of the load lever, especially whether or not an analog sensor can detect the position of the load lever or at least whether a suitable switch (e.g., a switch which can be directly or indirectly actuated by the load lever) furnishes information denoting the actuation, absence of actuation and/or the extent of actuation of the load lever.

Information indicating that the load lever has been actuated is or can be interpreted as denoting that the driver or operator wishes to start the vehicle. As indicated by the block 104, this triggers the step of increasing the engine RPM to a desired value while the torque transmission system remains at least substantially disengaged. The block 105 is indicative of the step of ascertaining whether or not the desired value of the engine RPM has been reached. If the answer is in the negative, the engine RPM (block 104) is further increased prior to repeating the step (block 105) of ascertaining whether or not the engine RPM has risen to the desired value. If the now ascertained engine RPM matches or at least closely approximates the desired value, the next step (block 106) involves an engagement of the torque transmission system to achieve a planned reduction of the engine RPM while the position of the load lever remains unchanged and the input RPM of the transmission increases. The desired value of the engine RPM (block 104) and/or the rate or mode of reducing the engine RPM (block 106) depends upon the extent and/or the velocity of actuation of the load lever so that, in such instance, an acceptance or adaptation of the driver's desire can take place because, for a desired increased or more pronounced acceleration, the engine RPM can first rise to a higher value prior to engagement of the torque transmission system and the synchronizing of the engine RPM and the transmission input RPM is reached within a shorter interval of time so that the acceleration of the vehicle is more pronounced than under circumstances when the synchronization of the two RPMs is reached with a greater delay. A lowering of the engine RPM takes place due to the load upon the engine which develops in response to engagement of the torque transmission system.

When the transmission input RPM matches the engine RPM (block 107), namely when the synchronization point is reached, the engine RPM and the transmission input RPM proceed to increase in synchronism (block 108) with the acceleration progressing in a normal way, namely so that the clutch essentially transmits the applied torque. The engine RPM thereupon decreases or remains unchanged, depending upon the movement of the load lever. The block 109 in the diagram of FIG. 7 denotes the termination of the starting routine.

If the transmission input RPM does not match or at least closely approximate the engine RPM at that stage of the starting routine which is denoted by the block 107 in the diagram of FIG. 7, the torque transmission system is engaged to a greater extent (block 106) until the transmission input RPM reaches or at least approximates the engine RPM.

It is also within the purview of the invention to design the control unit (such as the control unit 13 of FIG. 1) in such a way that it can interpret the shifting, for example, of a lever (such as the lever 18 in FIG. 1) by the driver of the motor vehicle to a position in which the transmission (such as the transmission 4 shown in FIG. 1) is out of neutral (and while the engine RPM exceeds a preselected value) as the driver's or operator's desire to achieve a more pronounced acceleration of the vehicle. The control unit then selects the acceleration of the vehicle accordingly.

The just described shifting of the transmission out of neutral by the driver or operator of the vehicle, while the engine RPM is relatively high, is evaluated by the control unit as indicating that the driver desires to achieve a pronounced (higher than a standard) acceleration of the motor vehicle. This entails an engagement of the clutch (such as the torque transmission system 3 of FIG. 1) which, in turn, entails a reduction of the engine RPM due to the selected transmissible clutch torque so that the kinetic energy of the engine and of the flywheel (such as the parts 2 and 3c shown in FIG. 1) is converted into the kinetic energy of the vehicle (1 in FIG. 1). The just described method of intensifying the acceleration of the vehicle can also be put to use in response to other signals or indications, for example, it the transmission lever is shifted out of the neutral position prior to or during actuation of the gas pedal to increase the rate of admission of fuel into the engine.

It can also be of advantage if the preselectable value of the engine RPM substantially matches or exceeds the RPM at the instant of synchronization in the course of a standard or normal vehicle starting operation. In such instances, the engagement of the clutch does not entail a reduction of the engine RPM; such RPM continues to increase as a function of time, at least temporarily, at a constant rate.

It can also be advisable if the preselectable value of the engine RPM is maintained within the range of between 1,000 and 6,000 RPM. It is presently preferred to preselect an engine RPM in the range of between about 1,500 and 4,000 RPM.

Still further, it is often advisable if the RPM at the synchronization point or instant matches that RPM which is a least substantially the same for the engine and for the input of the transmission when the clutch is engaged.

If the depressed clutch pedal is released at a high engine RPM to achieve a desirable so-called snap or crack acceleration, the initial acceleration of the vehicle is quite pronounced, i.e., above a standard acceleration. As a rule, or at least in many instances, a normal or standard acceleration of a vehicle employing an automated clutch is in the range of between about 0.05 g and 1 g (g=acceleration of gravity= 980.665 cm/sec$^2$); the above range can vary in dependency upon the extent of motorizing and the weight of the motor vehicle. On the other hand, the improved method and apparatus render it possible to achieve more pronounced or higher than standard accelerations exceeding the standard accelerations by between about 0.05 g and 1 g, i.e., one can achieve actual accelerations in the range of between 0.1 g and 2 g, depending on the types of vehicles. At the present time, the additional acceleration (above a standard acceleration) is in the range of between 0.02 g and 1 g.

Experiments with a test vehicle (with a standard acceleration of about 0.5 g) indicate that, by resorting to the method and to the apparatus of the present invention, the acceleration can be increased to at least 0.7 g.

Figure 8:
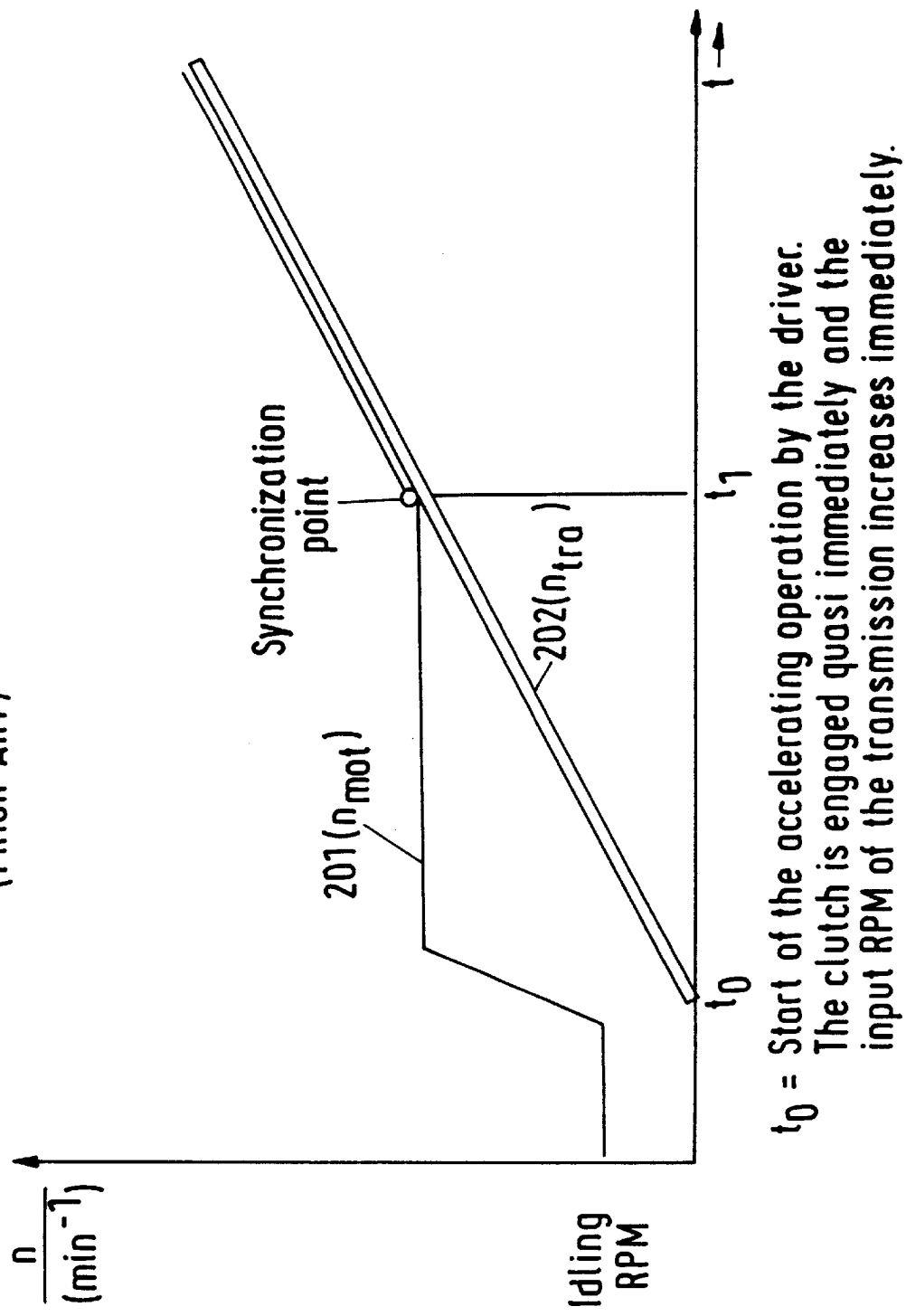
FIG. 8 is a diagram wherein the curves indicate changes of the engine RPM and the transmission input RPM during starting of a motor vehicle in accordance with a prior proposal.

The diagram of FIG. 8 shows curves 201, 202 which respectively denote the engine RPM ($n_{mot}$) and the transmission RPM ($n_{tra}$) during starting of a motor vehicle as a function of time in accordance with a prior proposal. As can be seen, acceleration of the vehicle by the driver at the instant $t_0$ entails a simultaneous rise of the engine RPM (curve 201) and of the input RPM (curve 202) of the transmission. Moreover, FIG. 8 shows that the rate of increase of the input RPM of the transmission (curve 202) is the same prior to and after the instant $t_1$ at which the RPM of the engine is synchronized with the input RPM of the transmission. A comparison of the curve 202 with the corresponding curves in the diagrams of FIGS. 3, 5 and 6 indicates that the improved method and apparatus render it possible to achieve a more pronounced rise of the input RPM of the transmission prior to as well as subsequent to the synchronization point.

An important advantage of the improved method of and apparatus for automatically regulating the operation of a clutch or an analogous torque transmission system, i.e., of an intelligent clutch management, in comparison with footactuated clutches is that the improved method and apparatus eliminate the possibility of choking of the engine in response to improper manipulation of the vehicle by the operator. Furthermore, the improved method and apparatus render it possible to maintain the engine RPM at a very low value because, at least in most instances, (i.e., as a rule) the electronic control unit of the apparatus can react to the danger or likelihood of engine choking much more rapidly than is possible in accordance with heretofore known proposals.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque transmission and, therefore, such adaptations should and are intended to be comprehended within the meaning and range of equivalence of the appended claims.

What is claimed is:

1. A method of regulating the operation of an adjustable torque transmission system in a motor vehicle which is accelerable from zero speed and has a power train including a prime mover and a variable-ratio transmission downstream of the prime mover, the vehicle further having a device for adjusting said system so as to vary the torque which is being transmitted by the system, a signal processing and control signal transmitting control unit for said device, an electronic unit arranged to transmit to said control unit signals to enable the control unit to ascertain at least one of (a) an operating condition of the vehicle and (b) a vehicle operator's desire concerning the operating condition, comprising the steps of accelerating the vehicle in at least two stages; and transmitting during said at least two stages from said control unit to said device control signals to effect an adjustment of said system which adjustment ensures a planned acceleration of the vehicle in dependency upon at least one of (i) at least one of a plurality of preselected values including an RPM of the prime mover, an RPM of the transmission and time and (ii) at least one function of at least one of said plurality of preselected values.

2. A method of regulating the operation of an engageable and disengageable torque transmission system in a motor vehicle which is accelerable from zero speed, comprising the steps of accelerating the vehicle in at least two stages; and adjusting the transmission of torque by said system within said at least two stages in dependency upon at least one of (a) at least one of a plurality of preselectable values including an RPM of a variable-RPM prime mover in a power train of the vehicle, a variable input RPM of a variable drive ratio transmission in the power train, and time, and (b) at least one function of at least one of said preselectable values to thus achieve a planned acceleration of the vehicle.

3. The method of claim 2, wherein said stages include a first stage and a second stage and said adjusting step comprises maintaining said system in a disengaged condition at least during a portion of said first stage.

4. The method of claim 2, wherein said accelerating step includes accelerating the vehicle in at least three stages.

5. The method of claim 2, wherein said stages include a first stage and further comprising the step of effecting an increase of the RPM of the variable-RPM prime mover of the vehicle at least close to a predetermined RPM during said first stage.

6. The method of claim 5, wherein said adjusting step includes maintaining the transmitted torque at least close to zero during said first stage.

7. The method of claim 2, wherein said stages include a first stage and a second stage, and further comprising the steps of effecting an increase of the RPM of the prime mover in the power train of the vehicle to a predetermined RPM during a first portion of said second stage, maintaining the input RPM of of the transmission at least close to zero during said first portion of said second stage, and increasing said input RPM of the transmission to at least approximate the RPM of the prime mover at the end of said second stage.

8. The method of claim 2, wherein said stages include a first stage and a second stage and said adjusting step includes adjusting the transmission of torque during said second stage to increase the RPM of the prime mover to a desired value, not later than to maintain the input RPM of the transmission at least close to zero not later than during a first portion of said second stage, and to increase the input RPM to at least approximate the RPM of the prime mover not later than at the end of the second stage.

9. The method of claim 2, wherein said stages include first, second and third stages and said adjusting step comprises selecting the transmission of torque during said third stage to vary an input RPM of said system as a function of time and in at least substantial synchronism with a variable output RPM of said system.

10. The method of claim 9, wherein said adjusting step further comprises selecting the transmission of torque during said third stage in dependency upon a selected drive ratio of the transmission.

11. The method of claim 10, wherein said adjusting step includes achieving a higher than a standard acceleration of the vehicle.

12. The method of claim 2, wherein said stages include a first stage and a second stage, said adjusting step comprising equalizing a variable input RPM with a variable output RPM of said system in said second stage to thus achieve a higher than a standard acceleration of the vehicle.

13. The method of claim 2, wherein said stages include a first stage and a second stage, said adjusting step comprising at least substantially equalizing in said second stage the RPM of the prime mover with variable RPM of the transmission to thus achieve a higher than a standard acceleration of the vehicle.

14. The method of claim 2, wherein at least one of said at least one preselectable value and said at least one function is in the form of signals denoting the desire of a driver of the motor vehicle concerning the acceleration of the vehicle.

15. The method of claim 2, wherein at least one of said at least one preselectable value and said at least one function is in the form of input parameters pertaining to the torque transmission system.

16. The method of claim 2, wherein at least one of said at least one preselectable value and said at least one function is in the form of signals denoting the desires of a driver of the motor vehicle concerning the acceleration of the vehicle, and further comprising the step of generating said signals on the basis of at least one of a plurality of different positions, a plurality of different dynamics and a plurality of different gradients of a load lever of the vehicle.

17. The method of claim 2, wherein at least one of said at least one preselectable value and said at least one function is in the form of signals denoting the desires of a driver of the motor vehicle concerning the acceleration of the vehicle, and further comprising the steps of generation and long-range adaptation of said signals on the basis of at least one of a plurality of different positions and a plurality of different gradients of a load lever of the vehicle.

18. The method of claim 2, wherein at least one of said at least one preselectable value and said at least one function is in the form of signals denoting at least one of (A) a driver of the vehicle and (B) a desire of the driver concerning the acceleration of the vehicle and based on at least one of (C) driver identification and (D) actuation of a selector switch, said adjusting step including utilizing said signals to achieve an adaptive regulation of acceleration of the vehicle from zero speed.

19. The method of claim 2, wherein said stages include a first stage and a second stage, said accelerating step including determining or fixing or selecting the speed of the vehicle at the end of said first stage and at the start of said second stage to match a desired value in dependency upon the desire of a driver of the vehicle.

20. The method of claim 2, wherein said stages include a first stage and said adjusting step comprises selecting the variable RPM of the prime mover to at least approximate an idling RPM of the prime mover at a start of said first stage and to rise at least approximately to a desired RPM between said start and an end of said first stage.

21. The method of claim 2, wherein said adjusting step includes a planned increase of at least one of a variable input RPM of the system and the variable RPM of the prime mover in the power train of the vehicle.

22. The method of claim 2, wherein said stages include a first stage and a second stage and said adjusting step comprises developing the timely progress of at least one of a variable input RPM of said system and the variable RPM of the prime mover in the power train of the vehicle and, during said second stage, at least one of a variable input RPM of said system and a variable input RPM of a transmission in said power train in dependency upon a selected torque being transmissible by said system.

23. The method of claim 2, wherein said stages include a first stage and a second stage and said adjusting step comprises maintaining in said second stage at an at least substantially constant value at least one of a variable input RPM of said system and the variable RPM of the prime mover in the power train of the vehicle, and conforming to said constant value at least one of a variable output RPM of said system and the variable input RPM of the transmission in said power train.

24. The method of claim 23, further comprising the steps of utilizing the torque which is transmissible by said system during said second stage to reduce at least one of the input RPM of said system and the RPM of said prime mover, and at least substantially conforming at least one of said variable output RPM of said system and said variable input RPM of said transmission to the reduced RPM.

25. The method of claim 2, wherein said stages include a first stage and a second stage, and further comprising the steps of utilizing the adjusted torque to effect a reduced increase of a variable input RPM of said system during said second stage and of conforming at least one of a variable output RPM of said system and the variable input RPM of the transmission in the power train of the vehicle to said variable input RPM of said system.

26. The method of claim 2, wherein said stages include first, second and third stages and said adjusting step comprises matching a variable input RPM and a variable output RPM of said system at a synchronizing instant during said third stage and increasing said input RPM in synchronism with said output RPM during said third stage subsequent to said instant.

27. The method of claim 26, wherein the transmission is a multiple speed ratio transmission and said increasing step includes increasing said input RPM and said output RPM as a function of the speed ratio of the transmission.

28. The method of claim 2, wherein said stages include first, second and third stages and said adjusting step includes a first acceleration of the vehicle during said second stage and a lesser second acceleration of the vehicle during said third stage.

29. The method of claim 2, wherein said adjusting step comprises carrying out an initial part of said planned acceleration of the vehicle with a view to reduce a thermal stress upon said system.

30. The method of claim 29, wherein said system is operable with varying degrees of slip and said initial part of said planned acceleration entails a reduction of a variable input RPM of said system and a greater reduction of said slip within an interval shorter than the interval of substantially identical reduction of slip in the absence of the carrying out or said initial part of said planned acceleration of the vehicle with a view to reduce said thermal stress.

31. The method of claim 2, further comprising the step of increasing the RPM of a prime mover in the power train of the vehicle at least to one of a threshold RPM and a threshold value, said adjusting step including varying said transmission of torque as a function of time subsequent to said step of increasing the RPM of the prime mover to effect a reduction of the RPM of the prime mover and an attendant reduction of a torque which is being transmitted by the prime mover to less than the torque being transmitted by a clutch of said system, as well as a higher acceleration of the vehicle and a reduction of thermal stress upon said system.

32. The method of claim 2, wherein said stages include a first stage and a second stage, and further comprising the step of effecting a reduction of the variable RPM of the prime mover in said second stage in response to adjustment of the transmission of torque by said system until the completion of an at least substantial synchronization of the variable input RPM and a variable output RPM of the transmission in said power train.

33. The method of claim 2, wherein said stages include a first stage and a second stage, and further comprising the step of operating said system with a variable slip between at least one driving part and at least one driven part thereof at least substantially only in said second stage.

34. The method of claim 2, wherein said system includes a clutch and further comprising the step of ascertaining or calculating an energy input into portions of said system in dependency upon at least one of (i) differences between the RPMs of relatively rotatable friction surfaces of said system, and (ii) the transmitted clutch torque.

35. The method of claim 2, further comprising the step of calculating a thermal stress upon at least a portion of said system in accordance with the equation $$E_K = \int |\omega_M - \omega_K| * M_K dt,$$

wherein $E_K$ is friction energy developing between relatively rotatable parts of said system, $\omega_M$ denotes a variable input RPM of said system, $\omega_K$ denotes a variable output RPM of said system, and $M_K$ denotes the transmitted torque.

36. The method of claim 2, further comprising the step of ascertaining a thermal stress upon at least a portion of said system, including dynamically determining as a function of time the cooling of said system due to at least one of (i) heat conduction, (ii) heat radiation and (iii) convection.

37. The method of claim 2, further comprising the step of ascertaining or calculating at least one of (i) an energy input and (ii) the temperature of at least one portion of said system as a function of at least one of a plurality of signals denoting the variable RPM of the prime mover in the power train of the vehicle, a variable angle of a throttle valve of the vehicle, a variable pressure in a suction intake manifold of the vehicle, the variable input RPM of the transmission in said power train, branchings of auxiliary consumers in the vehicle, a tachometer generator of the vehicle, the position of an actuating member for a clutch of said system, a variable output RPM of said transmission, a variable output RPM of said system, a temperature sensor, the torque being applied to said system and the torque being transitted by said system.

38. The method of claim 2, wherein said stages include a first stage of acceleration of the vehicle, and further comprising the step of adaptively regulating a variable threshold value of the variable RPM of the prime mover in the power train of the vehicle prior to said first stage of acceleration.

39. The method of claim 2, wherein said stages include a first stage of acceleration of the vehicle, and further comprising the steps of adaptively regulating a variable threshold value of the variable RPM of the prime mover in the power train of the vehicle in dependency upon the desire of a driver of the vehicle regarding the acceleration of the vehicle so that said threshold value is at least reached prior to said first stage of acceleration of the vehicle.

40. The method of claim 2, wherein said adjusting step comprises adjusting the transmission of torque upon a determination of the desire of a driver of the vehicle regarding the acceleration of the vehicle and subsequent to a legitimizing of the driver in dependency upon at least one of safety and theft prevention controls in the vehicle.

41. The method of claim 2, wherein said adjusting step comprises adjusting the transmission of torque to one of a desired value and a threshold value in dependency upon a variable gradient of a load lever of the vehicle.

42. The method of claim 2, wherein said adjusting step comprises adaptively ascertaining the position of an adjustable gas pedal of the vehicle and selecting an adaptively fixed threshold value for the variable RPM of the prime mover in the power train of the vehicle prior to initiation of a transmissible torque.

43. The method of claim 2, further comprising the step of adaptively selecting a maximum RPM of the variable RPM of the prime mover in the power train of the vehicle.

44. The method of claim 2, further comprising the step of selecting a maximum RPM of the variable RPM of the prime mover in the power train of the vehicle in dependency upon the desire of a driver of the vehicle regarding the acceleration of the vehicle.

45. The method of claim 2, further comprising the steps of adaptively ascertaining at least one of (i) the position and (ii) the dynamics of an adjustable gas pedal of the vehicle, and adaptively selecting a final value of the variable RPM of the prime mover in the power train of the vehicle.

46. The method of claim 2, further comprising the step of installing the transmission upstream of said system in the power train of the vehicle.

47. The method of claim 2, wherein said adjusting step includes adjusting the transmission of torque in dependency upon a variable output RPM of said system in lieu of the variable input RPM of the transmission in the power train of the vehicle.

48. A method of regulating the operation of an adjustable torque transmission system in a power train of a motor vehicle which is accelerable from zero speed, the power train further including a prime mover upstream and a variable-ratio transmission downstream of said system and the vehicle further having a device for adjusting said system so as to vary the torque which is being transmitted by the system, a central signal processing and transmitting control unit for said device, and electronic units arranged to transmit to said control unit signals to enable the control unit to determine within at least one region of said system at least one of an energy input and a temperature, comprising the steps of accelerating the vehicle from said zero speed; and adjusting the transmission of torque by said system during acceleration of the vehicle from zero speed so that, at first, the transmissible torque at least approximates zero until a variable RPM of the prime mover at least reaches a threshold value, and that the vehicle undergoes a first acceleration at least when said prime mover RPM reaches said threshold value, with attendant variation of the transmissible torque to reduce the prime mover RPM, to achieve a more pronounced acceleration of the vehicle, and to reduce said energy input at least within a portion of said system.

49. Apparatus for regulating the operation of an adjustable torque transmission system in a power train of a motor vehicle which is accelerable from a zero speed and wherein the power train further includes a prime mover upstream and a variable-ratio transmission downstream of said system, comprising a device for adjusting said system so as to vary the torque which is being transmitted by said system; and a central signal processing and control signal transmitting control unit for adjusting said system by way of said device in a planned manner to achieve a higher than a standard acceleration of the vehicle.

50. The apparatus of claim 49, further comprising at least one sensor having means for generating signals denoting at least one of a substantial stillstand and a slight rolling movement of the vehicle.

51. The apparatus of claim 49, further comprising at least one sensor having means for generating signals denoting at least one of a starting of the vehicle and an intention of a driver of the vehicle regarding the acceleration of the vehicle.

52. The apparatus of claim 51, wherein said at least one sensor includes means for generating signals denoting at least one of the driver's desires concerning the acceleration of the vehicle and the intensity of acceleration of the vehicle.

53. The apparatus of claim 52, wherein said at least one sensor includes means for generating signals in dependency upon at least one of the position of an adjustable load lever and a gradient of the load lever.

54. The apparatus of claim 49, wherein said power train further includes a prime mover having a range of RPMs above and below a predetermined value, and a transmission which is adjustable to assume a plurality of positions including a neutral position, said device being operative to evaluate an adjustment of the transmission by a driver of the motor vehicle to a position other than said neutral position, and while the RPM of the prime mover exceeds said predetermined value, as an indication of the driver's desire to achieve said higher acceleration of the vehicle and to effect said higher acceleration as a result of such evaluation.

55. The apparatus of claim 54, wherein said predetermined value is between 1,000 and 6,000 RPM.

56. The apparatus of claim 54, wherein an input RPM of said transmission rises in synchronism with the RPM of said prime mover when the RPM of said prime mover rises to a given value which at least substantially matches or exceeds said predetermined value.

57. The apparatus of claim 56, wherein said given value at least approximates that RPM of said prime mover at which the RPM of said prime mover at least approximates the input RPM of said transmission while said system is engaged to transmit torque in said power train.

58. Apparatus for regulating the operation of an adjustable torque transmission system in a power train of a motor vehicle which is accelerable from a zero speed, comprising an activatable adjusting device for said system; a signal receiving, processing and transmitting central control unit; and at least one electronic unit having means for supplying to said control unit signals denoting a plurality of input values pertaining to an operating condition of the vehicle so that said control unit actuates said adjusting device to effect a higher than a standard acceleration of the vehicle.

59. The apparatus of claim 58, wherein said signals denote the desires of a driver of the vehicle concerning the acceleration of the vehicle.

* * * * *